(No Model.)
A. W. CASH.
NIPPLE CHUCK.
No. 452,769.
Patented May 26, 1891.
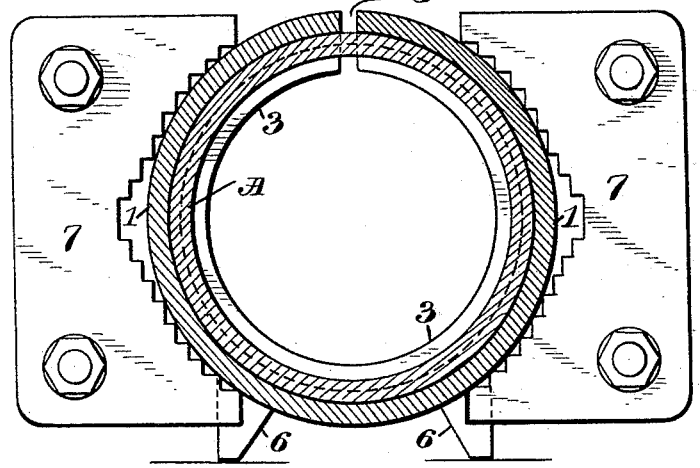
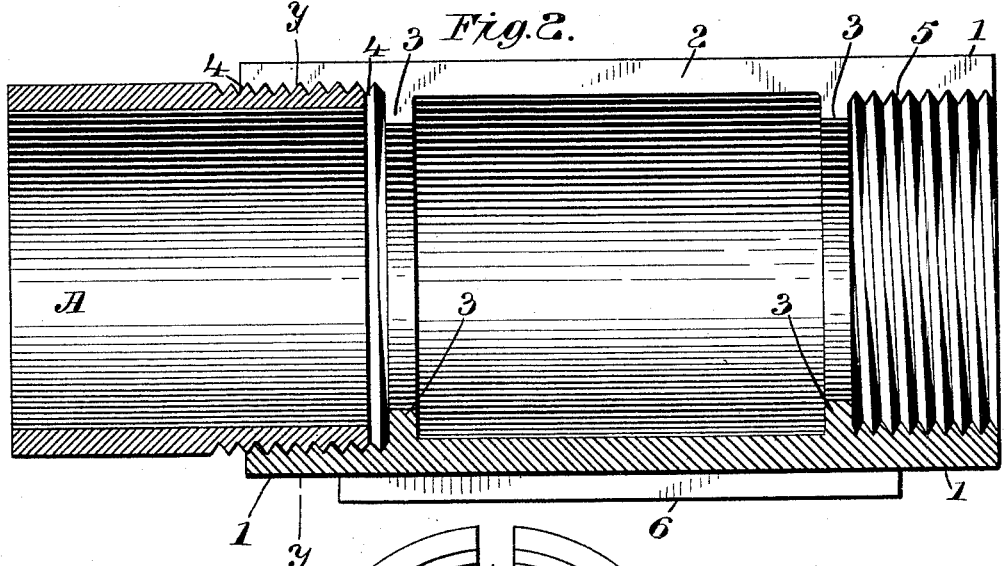
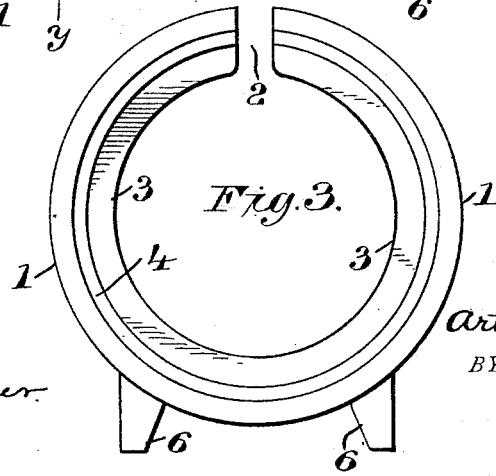
WITNESSES:
Wm. J. Tanner
A. J. Tanner
INVENTOR,
Arthur W. Cash
BY J. H. Hubbard
ATTORNEY.
THE NORRIS PETERS CO., PHOTO-LITHO., WASHINGTON, D. C.

UNITED STATES PATENT OFFICE.

ARTHUR WISE CASH, OF BRIDGEPORT, CONNECTICUT, ASSIGNOR TO THE ARMSTRONG MANUFACTURING COMPANY, OF SAME PLACE.

NIPPLE-CHUCK.

SPECIFICATION forming part of Letters Patent No. 452,769, dated May 26, 1891.

Application filed February 6, 1891. Serial No. 380,413. (No model.)

*To all whom it may concern:*

Be it known that I, ARTHUR WISE CASH, a citizen of the United States, residing at Bridgeport, in the county of Fairfield and State of Connecticut, have invented certain new and useful Improvements in Nipple-Chucks; and I do hereby declare the following to be a full, clear, and exact description of the invention, such as will enable others skilled in the art to which it appertains to make and use the same.

This invention relates to certain novel and useful improvements in nipple-chucks, and has for its object to provide a device of this description which shall be of great simplicity and which may be used in connection with any ordinary pipe-vise and threading-tools. I have, however, designed the present construction with a special reference to use in connection with the pipe-threading machine shown and described in certain Letters Patent of the United States, No. 434,424, granted to me the 19th day of August, 1890.

My invention consists in the construction and combination of elements as hereinafter set forth, and then recited in the claims.

In order that those skilled in the art to which my invention appertains may fully understand its construction and operation, I will describe the same in detail, reference being had to the accompanying drawings, which form a part of this specification, and in which—

Figure 1 is a transverse vertical section showing my improved chuck with a nipple therein, the chuck being held between a pair of vise-jaws. The section is upon the line *y y* of Fig. 2. Fig. 2 is a longitudinal vertical section on the line *v v* of Fig. 1, Fig. 3 an end elevation of the chuck.

Like numerals denote the same parts in all the figures of the drawings.

My improved chuck consists of a sleeve 1, split longitudinally, as seen at 2, so as to make it resilient, and therefore contractible within certain limits.

3 are annular internally-projecting abutments formed integral therewith.

At 4 and 5 the tubular ends of the chuck are threaded as far in as the abutments, the threaded ends being preferably of different diameters, so that each chuck may accommodate two different sizes of pipe.

6 are projections which are adapted to serve as legs, and also to prevent the chuck from turning in the vise-jaws, which are shown at Fig. 1 and are denoted by the numeral 7.

The operation of my invention is as follows: The chuck is first placed between the jaws of an ordinary or specially-arranged pipe-vise, substantially as shown at Fig. 1. The partially-threaded nipple which it is desired to complete is then screwed inward until its end engages the abutment. In Fig. 2 the nipple, which is denoted by A, is shown as not quite screwed home; but this is simply for the purpose of showing one of the threads 4 in elevation. When the nipple has thus been screwed in, the vise-jaws are contracted, thereby compressing the split chuck-body and causing it to firmly grasp the threaded end of the nipple. When so grasped, the projecting blank end may be threaded in any suitable manner. During the threading operation the nipple is held by the combined action of the contracted chuck-body and the internal support which the abutment affords to it. The contraction alone would hardly suffice to hold the nipple firmly, and were it not for the contraction of the chuck-body the action of the threading-tool would tend to drive the threaded end of the nipple so firmly against the abutment as to render its release difficult. When operating as shown and described, however, the nipple is held securely enough for all practical purposes, and is not caused to engage the abutment so tightly but that it may be readily unscrewed and removed. By providing the two ends of the chuck with threads of unequal size the same chuck serves two different sizes of nipples.

I claim as my invention—

1. A nipple-chuck as described, the same consisting of a tubular longitudinally-slotted body having its extremities internally threaded and provided upon its inner surface at the ends of the threaded portion with annular abutments, substantially as set forth.

2. As a nipple-chuck, the hollow longitudinally-slotted sleeve adapted for insertion between the jaws of a pipe-vise, said sleeve having its extremities internally threaded for the accommodation of nipples of different diameters, and having also the internally-projecting annular abutments, substantially as described.

In testimony whereof I affix my signature in presence of two witnesses.

ARTHUR WISE CASH.

Witnesses:
SHERMAN HARTWELL HUBBARD,
MINNA C. HINCHCLIFFE.